United States Patent [19]

Hua

[11] Patent Number: 5,570,600
[45] Date of Patent: * Nov. 5, 1996

[54] GEARSHIFT STICK LOCK FOR AUTOMOBILES

[76] Inventor: Wu P. Hua, P.O. Box 82-144, Taipei, Taiwan

[*] Notice: The term of this patent shall not extend beyond the expiration date of Pat. No. 5,572,889.

[21] Appl. No.: 342,748

[22] Filed: Nov. 21, 1994

Related U.S. Application Data

[63] Continuation-in-part of Ser. No. 91,790, Jul. 13, 1993, abandoned.

[51] Int. Cl.⁶ .................................................. B60R 25/06
[52] U.S. Cl. ........................ 70/247; 70/DIG. 57; 70/203; 70/417; 70/52
[58] Field of Search .......................... 70/247, 202, 203, 70/233, 38 A, 39, DIG. 57, 210–212, 180, 158, 163, 164, 52

[56] References Cited

U.S. PATENT DOCUMENTS

| | | | |
|---|---|---|---|
| 4,426,861 | 1/1984 | Chillis | 70/39 |
| 4,693,099 | 9/1987 | Cykman | 70/247 |
| 5,157,954 | 10/1992 | Pietras | 70/DIG. 57 |
| 5,163,308 | 11/1992 | Lillo | 70/DIG. 57 |
| 5,228,320 | 7/1993 | Liou | 70/247 |

FOREIGN PATENT DOCUMENTS

| | | | |
|---|---|---|---|
| 3313996 | 10/1984 | Germany | 70/233 |

*Primary Examiner*—Darnell M. Boucher
*Attorney, Agent, or Firm*—Alfred Lei

[57] ABSTRACT

A gearshift stick lock for an automobile including a lock body, a shackle including two legs engageable with the lock body, a sleeve for wholly fitting over a gearshift stick of the automobile and including two threaded holes and two lugs fixed to the sleeve, each of the two lugs having a hole aligned with a corresponding one of the threaded holes, and two screws each extending through a corresponding one of the threaded holes to bear against the gearshift stick of the automobile thereby fixedly mounting the sleeve on the gearshift stick, the legs of the shackle being engaged through the lugs respectively and engaged with the lock body so as to lock the gearshift stick in place.

1 Claim, 8 Drawing Sheets

GEARSHIFT STICK LOCK FOR AUTOMOBILES

CROSS-REFERENCE

This is a continuation-in-part of the application Ser. No. 08/091,790, filed Jul. 13, 1993, now abandoned.

BACKGROUND OF THE INVENTION

It has been found that automobiles have always been considered one of the most convenient forms of transportation available to us, whether from home to work, or for shopping. Hence, many thieves steal cars and sell to a garage of other places for easy money owing to this basic requirement. In view of this, many kinds of locks have been invented to prevent car theft, such as alarm, door lock, steering wheel lock, and gearshift stick lock etc. Among these, the steering wheel lock is inconvenient to use, the gearshift stick lock is not secure enough to prevent an automobile from being stolen, and the car alarm may sometimes missound.

FIG. 1 shows a prior art locking arrangement for the gearshift stick of a vehicle. As illustrated, such a lock cannot prevent the gearshift stick of a vehicle from being severed below the lock body and the car thief can sever cut off the gearshift stick below the lock body thus freeing the shifting mechanism so that the car can be driven.

Cykman, U.S. Pat. No. 4,693,099, also discloses a locking arrangement for the gearshift stick of vehicles. However, such a locking arrangement still cannot prevent the gearshift stick from being cut off below the lock body.

Therefore, it is an object of the present invention to provide a gearshift stick lock for an automobile which can obviate and mitigate the above-mentioned drawback.

SUMMARY OF THE INVENTION

This invention relates to a gearshift stick lock for an automobile.

It is the primary object of the present invention to provide a gearshift stick lock for an automobile which can effectively prevent the automobile from being stolen.

It is another object of the present invention to provide a gearshift stick lock for an automobile which can prevent a gearshift stick from being cut off with a saw below the lock.

It is still another object of the present invention to provide a gearshift stick lock for an automobile which has a sleeve which wholly fits over the gearshift stick and extends downwardly into the transmission case.

It is still another object of the present invention to provide a gearshift stick lock for an automobile which is easy to operate.

It is a further object of the present invention to provide a gearshift stick lock for an automobile which is simple in construction.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
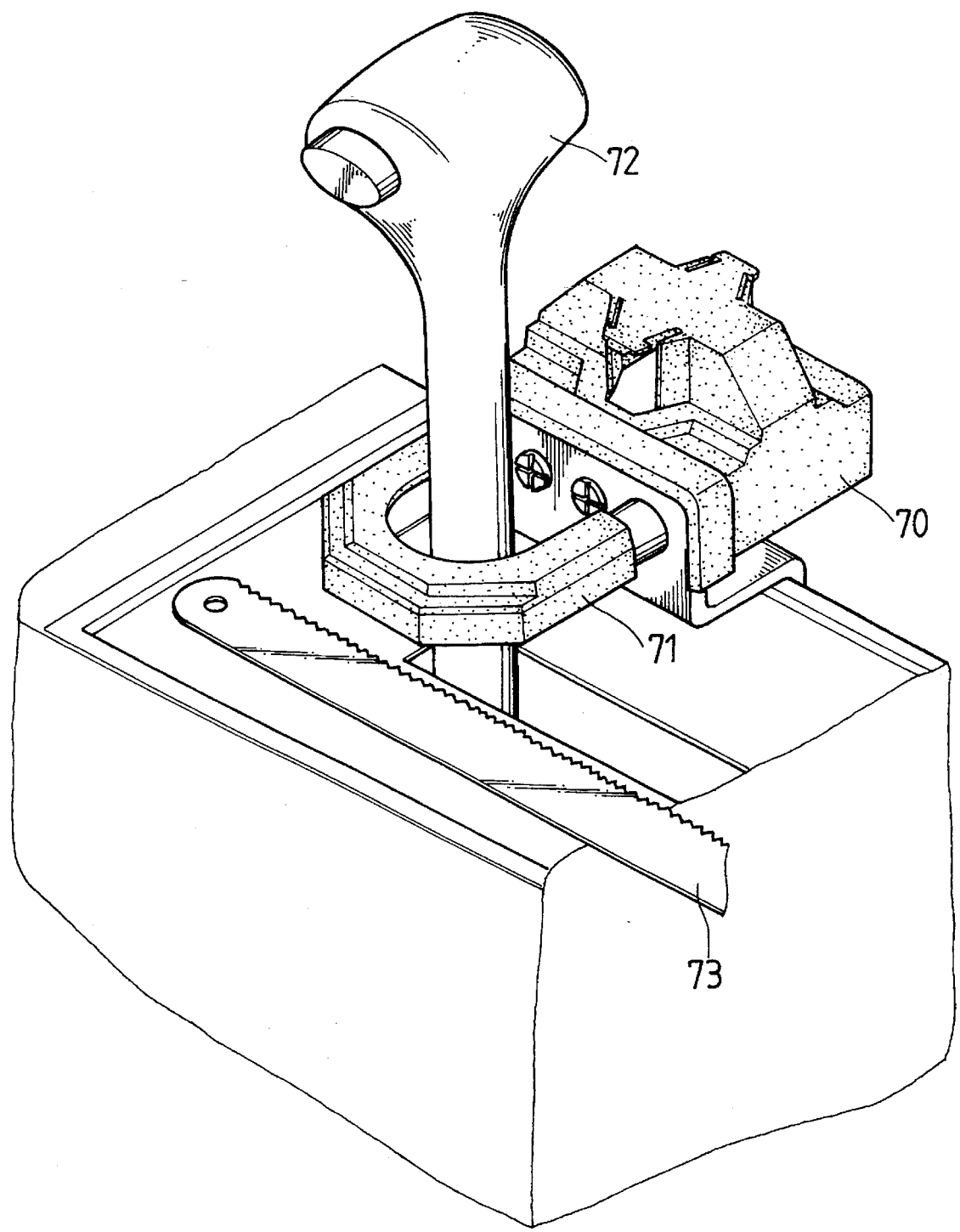
FIG. 1 is a perspective view of a prior art locking arrangement for the gearshift stick of vehicles.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
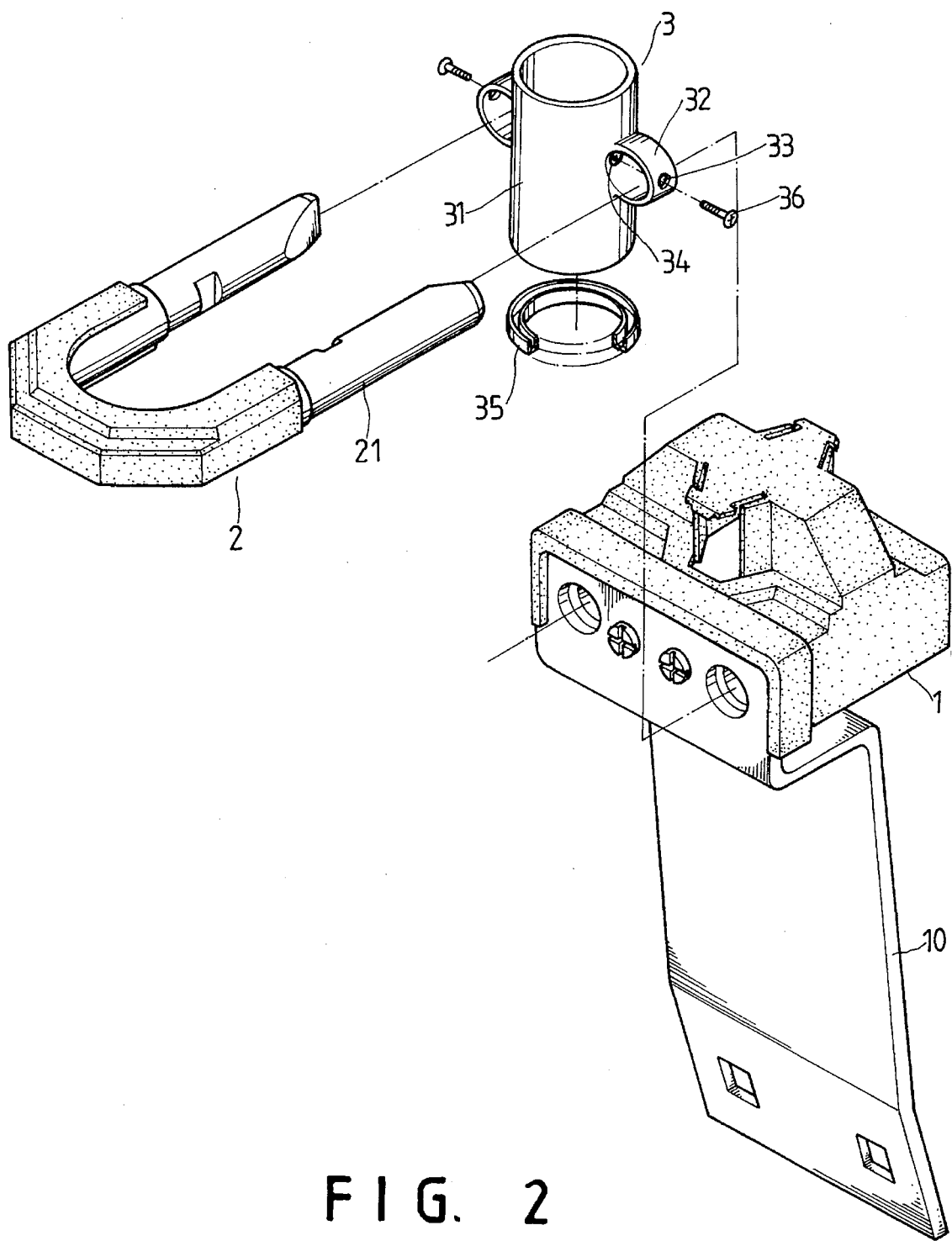
FIG. 2 is an exploded view of the present invention.
Figure 4:
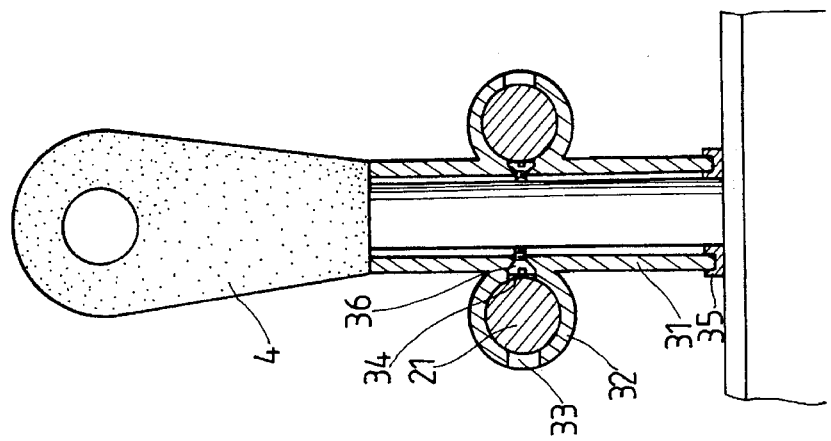
FIG. 4 is a sectional view taken along line 4—4 of FIG. 3.
Figure 3:
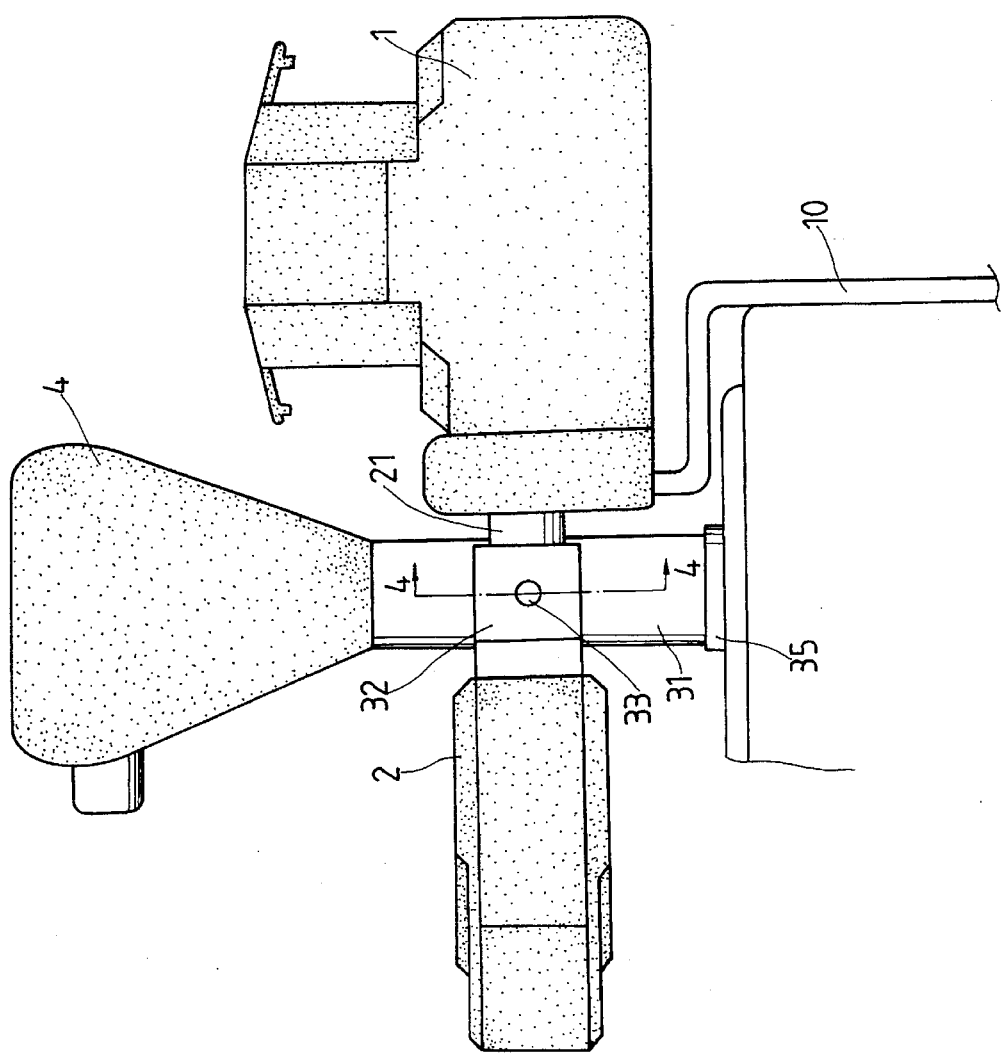
FIG. 3 is a sectional view of the present invention.

With reference to the drawings and in particular to FIGS. 2, 3 and 4, the gearshift stick lock according to the present invention comprises a lock body 1 disposed on a bracket 10 which is fixed to the transmission case of an automobile, a shackle 2 having two legs 21 engaged with the lock body 1 so as to lock a gearshift stick 4, and a sleeve 3 engaged with the gearshift stick 4. The sleeve 3 includes a body 31 having a pair of lugs 32 fixed or formed integral thereon, two holes 33 and 34 formed in each of the lugs 32 so that a screw 36 may engage through the respective lug 32 and fixed to the gearshift stick 4, and an annular pad 35 having a U-shaped cross section for engaging the bottom of the body 31 of the sleeve 3.

When in use, the shackle 2 is engaged through the lugs 32 and engaged with the lock body 1 so that the gearshift stick 4 can be locked thereby making it be suitably protected by the sleeve 3 and therefore preventing the gearshift stick 4 from being cut off with a saw below the lock body.

Figure 5:
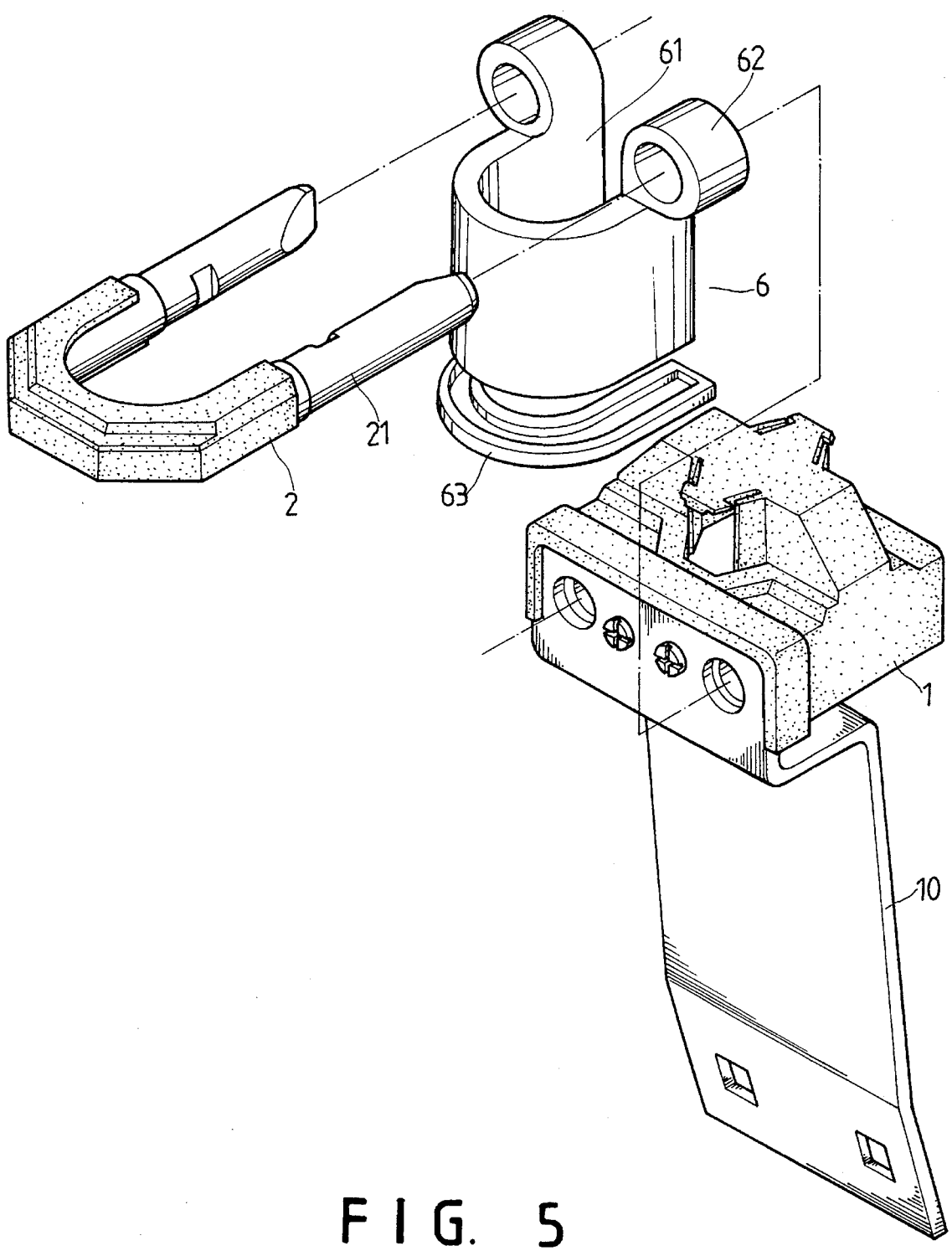
FIG. 5 is an exploded view of a second preferred embodiment according to the present invention.
Figure 7:
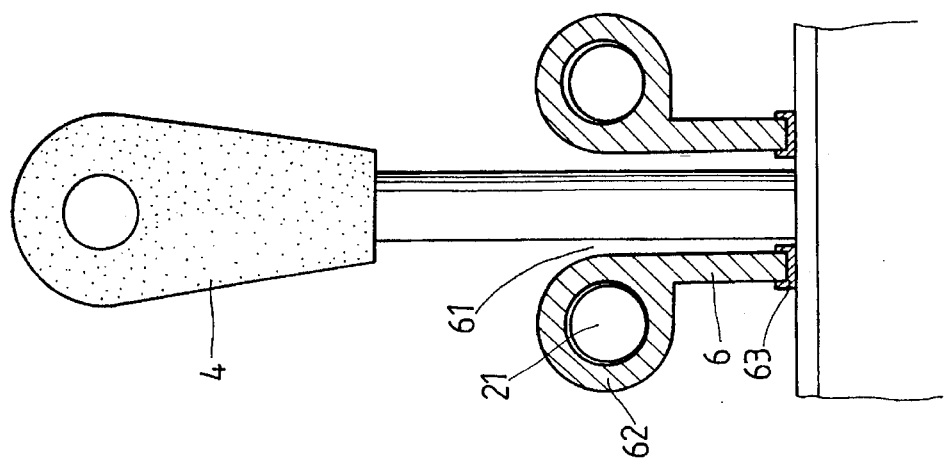
FIG. 7 is a sectional view taken along line 7—7 of FIG. 6.
Figure 6:
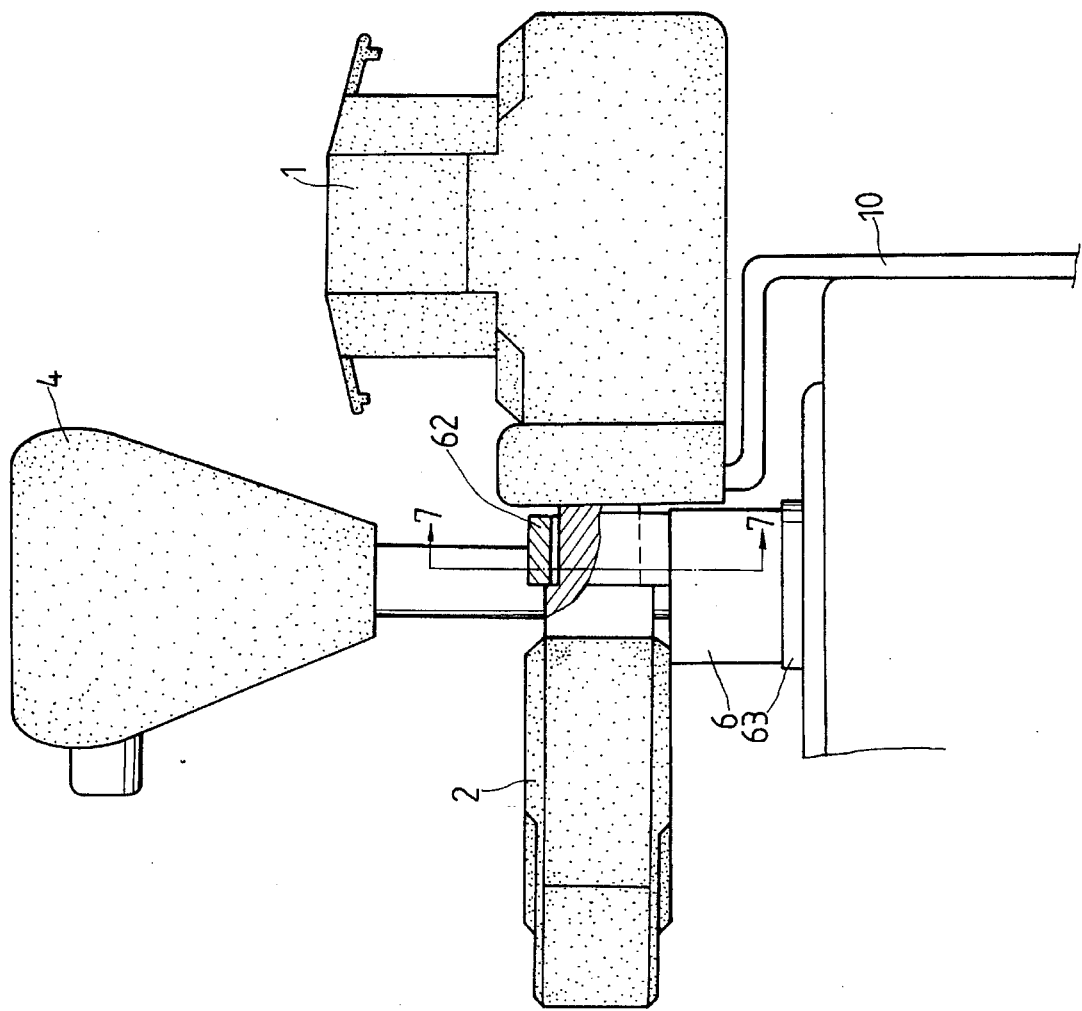
FIG. 6 is a sectional view of the second preferred embodiment.

FIGS. 5, 6 and 7 show a second preferred embodiment of the present invention. As illustrated, the sleeve 6 is a U-shaped member having an open side 61 for receiving the gearshift stick 4 and has a pair of lugs 62 on the top. A pad element 63 having a U-shaped cross section is fitted on the bottom of the sleeve 6. Similarly, the legs 21 of the shackle 2 are engaged through the lugs 62 and engaged with the lock body 1 so that the gearshift stick 4 can be locked and suitably protected by the sleeve 6.

Figure 8:
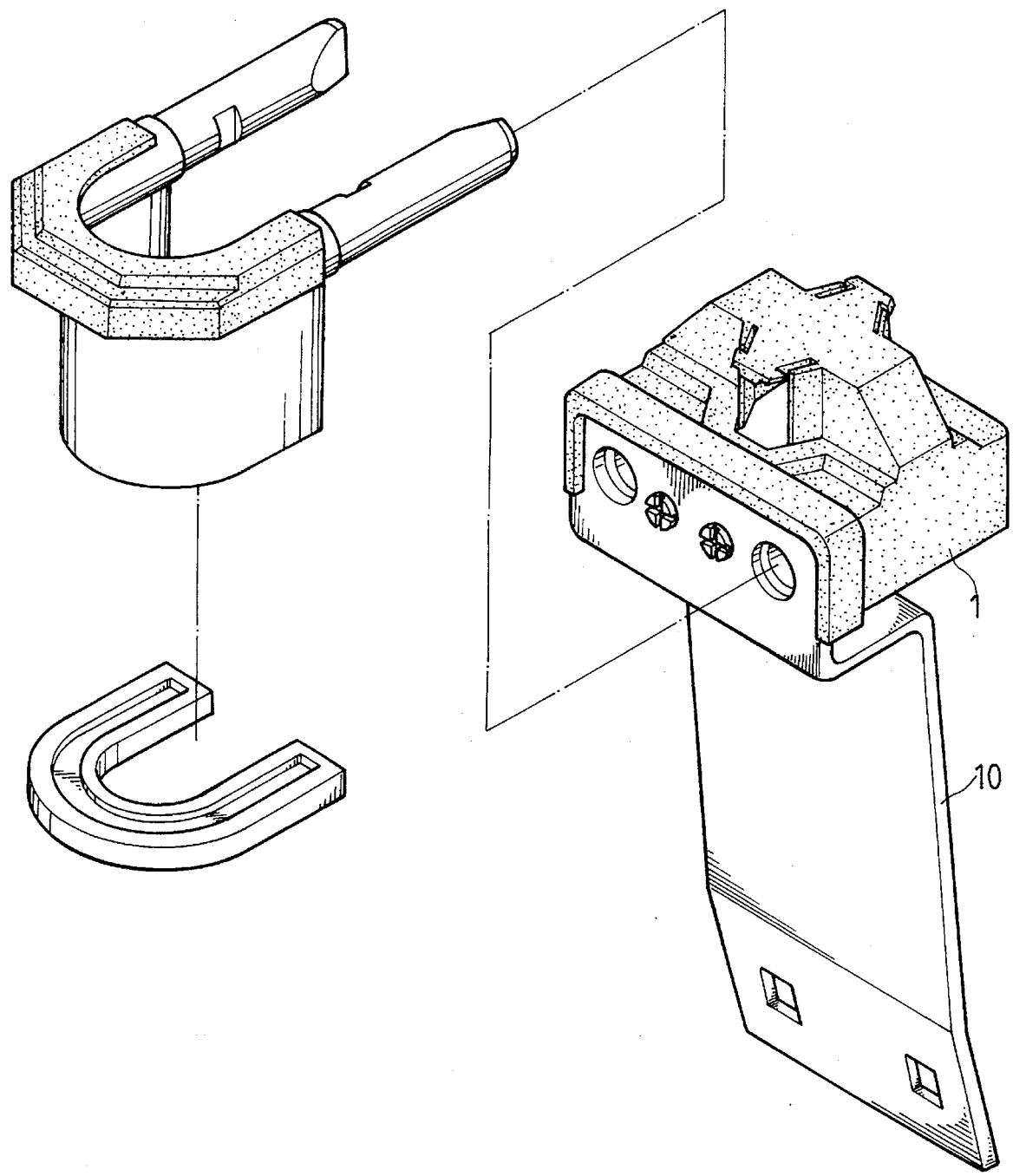
FIG. 8 is an exploded view of a third preferred embodiment according to the present invention.
Figure 9:
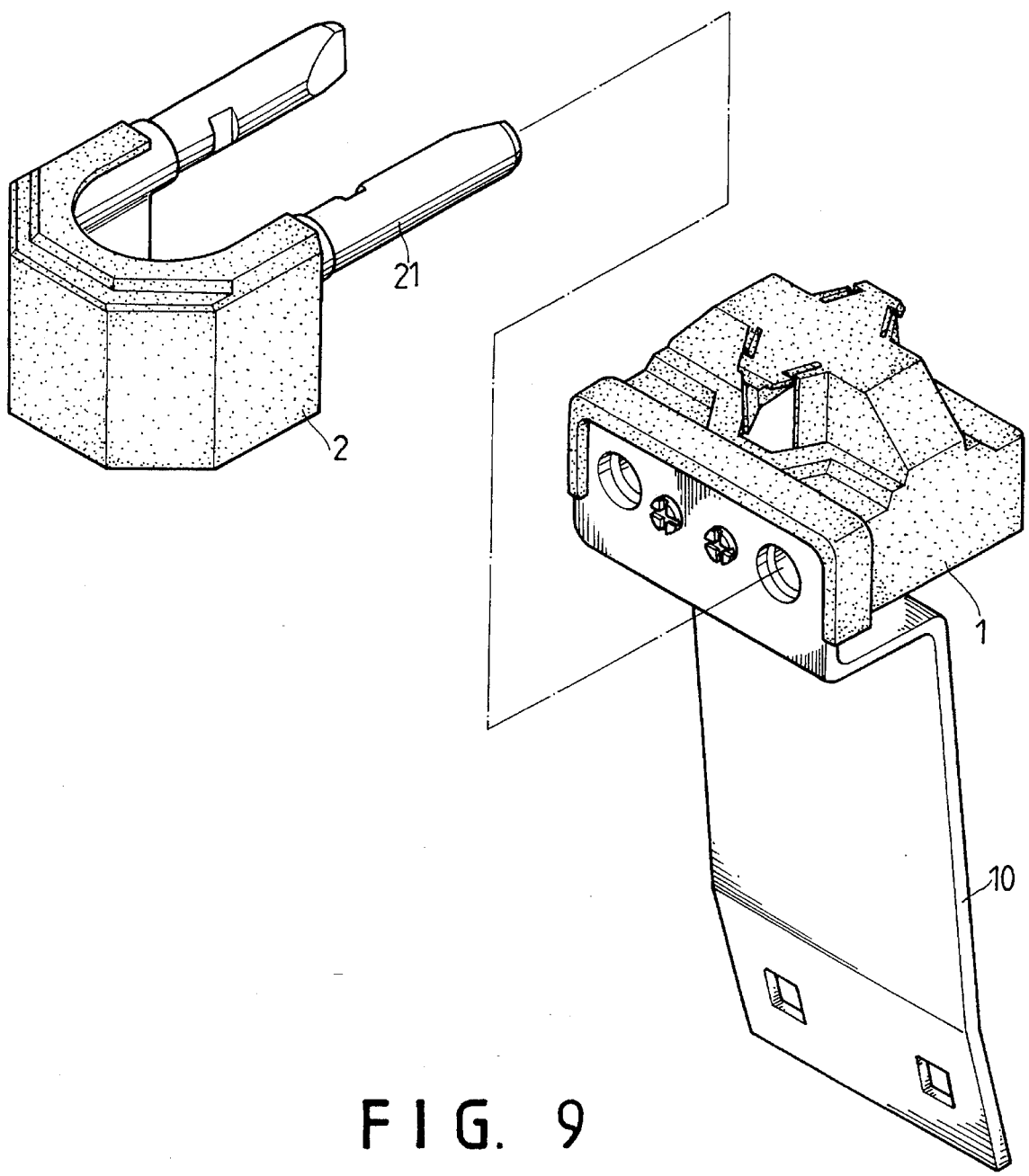
FIG. 9 is an exploded view of a fourth preferred embodiment according to the present invention.
Figure 10:
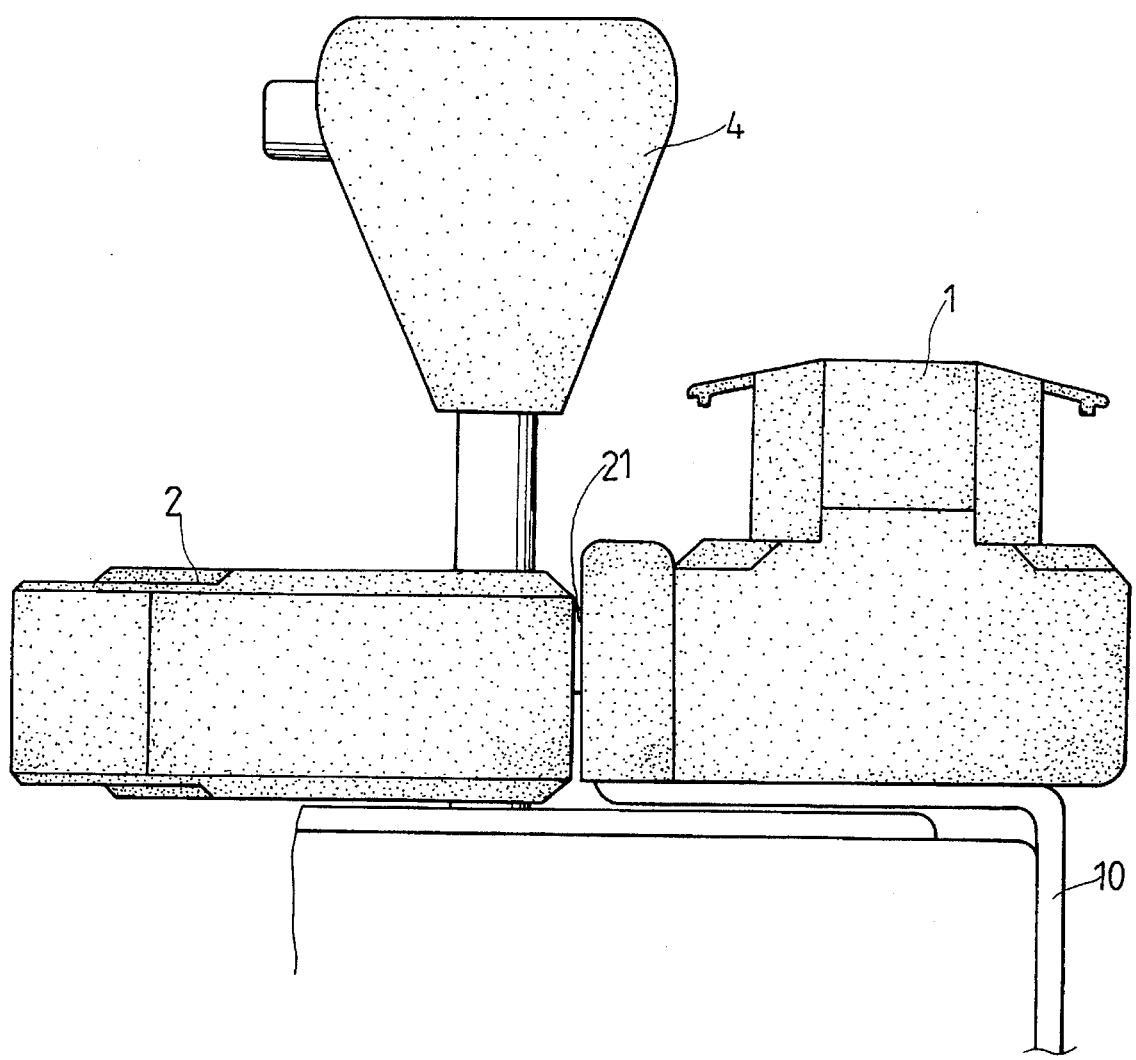
FIG. 10 is a side view of the fourth preferred embodiment.

FIGS. 8 and 9 illustrate a third preferred embodiment of the present invention. As can be seen, the shackle 2 is formed with an extension extending therefrom for covering and protecting the gearshift stick 4 so that the gearshift stick 4 can be prevented from being severed with a saw below the lock body.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A gearshift stick lock for an automobile having a transmission case, comprising:

a bracket fixedly mounted on said transmission case;

a lock body fixedly installed on said bracket;

a shackle including two legs engageable with said lock body;

a U-shaped sleeve having an open side adapted to receive a gearshift stick of an automobile, having a pair of circular lugs at a top adapted to receive the legs of said shackle, said lugs each having a threaded hole;

a pad having a U-shaped cross section adapted to receive a bottom of said U-shaped sleeve; and two screws each extending through a respective one of said threaded holes to bear against the gearshift stick of said automobile thereby fixedly mounting said sleeve on said gearshift stick;

said legs of said shackle being inserted through said lugs to engage said lock body so as to lock said gearshift stick in place.

* * * * *